United States Patent [19]

Enk et al.

[11] Patent Number: 4,799,948
[45] Date of Patent: Jan. 24, 1989

[54] ADJUSTABLE BEARING RAIL APPARATUS FOR BENDING GLASS SHEETS

[75] Inventors: Allan T. Enk; Charles H. Gerber, both of Toledo, Ohio

[73] Assignee: Libbey-Owens-Ford Co., Toledo, Ohio

[21] Appl. No.: 87,210

[22] Filed: Aug. 20, 1987

[51] Int. Cl.⁴ .................................. C03B 23/033
[52] U.S. Cl. .................................. 65/286; 65/273; 65/106
[58] Field of Search .................. 65/104, 106, 273, 163, 65/286

[56] References Cited

U.S. PATENT DOCUMENTS

| 4,043,783 | 8/1977 | Frank | 65/106 |
| 4,210,434 | 7/1980 | Galindez | 65/106 X |
| 4,557,745 | 12/1985 | Halberschmidt | 65/104 |

Primary Examiner—Arthur Kellogg
Attorney, Agent, or Firm—Marshall & Melhorn

[57] ABSTRACT

A pair of bearing rails support a plurality of conveyor rolls in a glass sheet bending station. Each of the bearing rails has a pair of linear actuators pivotally coupled to opposite ends thereof for permitting movement of the bearing rails in a vertical direction. The ends of each bearing rail are also coupled to a pair of roller racks which extend in a generally horizontal direction and are slidably attached to a supporting framework for moving the bearing rails toward and away from one another. The bearing rails are coupled to the roller racks by spherical bearings which permit the bearing rails to be canted or rotated about their longitudinal axes. The vertical, horizontal and rotational adjustments allow the conveyor rolls to be positioned for different configurations of glass sheets as the sheets are transported through the bending station.

20 Claims, 4 Drawing Sheets

1

ADJUSTABLE BEARING RAIL APPARATUS FOR BENDING GLASS SHEETS

BACKGROUND OF THE INVENTION

The present invention relates generally to the production of bent glass sheets and, more particularly, to an improved bearing rail apparatus in a press for bending glass sheets.

Bent sheets of glass are commonly used as glazing closures in vehicles such as automobiles and the like. It is often desirable to shape or form the glass in a manner to carry out styling features found in the adjacent sheet metal components in order to create the appearance of unity between the glass and the sheet metal. For example, in one design, an automotive backlight having inturned side portions extending into the side surface of the vehicle has a main body portion with a "S" shape or reverse bend for gradually merging at its upper and lower ends into the roof line of the vehicle as well as the deck lid, respectively. The attainment of such shapes is virtually impossible with conventional gravity type and press type bending molds. An apparatus for forming such a glazing closure is disclosed in U.S. Pat. No. 4,305,746 issued Dec. 15, 1981.

However, it is sometimes necessary to alter the curve of the central portion of the glazing structure from that which is desired for a particular part due to the restricted space provided by the location of the bearings in which the conveyor rails are mounted. This alteration has an affect on the radius of the pillar area and consequently on the amount of curve placed therein during preforming. If an adequate curve is not placed in this area by preforming, more pressure than desired is required by the male mold to properly shape the area to its final curvature. The additional pressure usually results in an unacceptable distortion when thin windshield glass is being pressed.

SUMMARY OF THE INVENTION

The above identified prior art problems are solved by the apparatus according to the present invention which provides greater flexibility in contour roll design resulting in rolls which provide better preforming and support for deep bend parts. The bearing rail apparatus according to the present invention includes a system of carriages and spherical bearings for moving the bearing rails horizontally, vertically and canting inwardly or outwardly to tailor the apparatus to a particular part shape. The vertical movement of the upstream and downstream ends of the rails is independently operable permitting the conveyor to be ramped downwardly or upwardly. Vertical movement of the rails is controlled by linear actuators while horizontal positioning and canting is manually set.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

DESCRIPTION OF THE PREFERRED EMBODIMENT

Figure 1:
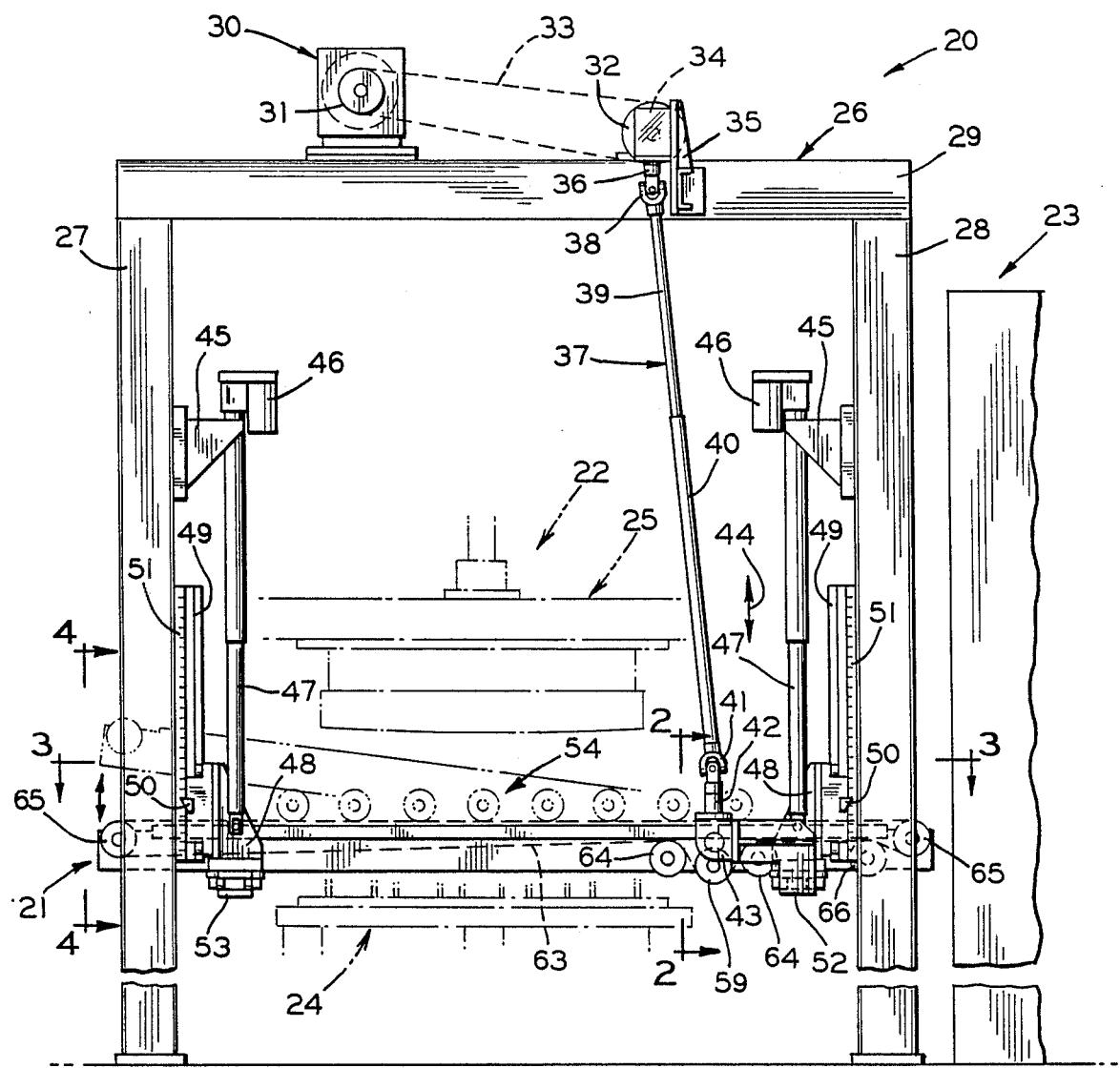
FIG. 1 is a side elevational view of a bending apparatus incorporating the present invention.

An apparatus 20 for horizontal glass sheet bending and tempering includes a continuous conveyor system 21 which receives glass sheets from a heating station (not shown) and moves the glass sheets through a bending apparatus 22, shown in phantom, to a tempering station 23. The glass sheets are heated to the softening point or bending temperatures in the heating station and are supported by the conveyor 21 as the sheets are delivered to the bending apparatus 22 for bending the heated sheets into the desired complex, irregular shape. The conveyor system 21 then delivers the sheets to the tempering station 23 for rapidly reducing the temperature of the bent sheets to produce the desired temper therein.

The bending apparatus 22 includes a movable lower press member 24, shown in phantom, and an upper press member 25, shown in phantom, both suitably mounted within a rigid, ground engaging, supporting framework 26. The framework 26 includes two substantially vertical columns 27 and 28 located at either end of the conveyor system 21, the column 27 being adjacent the forward end of the conveyor system 21 where the glass sheets enter and the column 28 being adjacent the tempering station 23. Not shown in FIG. 1 is another pair of columns 27 and 28 located on the opposite side of the conveyor system 21 and aligned with the respective ones of the columns 27 and 28. The columns 27 and 28 extend upwardly above the upper press member 25 and are tied together at their upper ends by a horizontal beam 29 extending longitudinally of the conveyor system 21. The beam 29 is representative of a similar beam tying together the upper ends of the columns on the opposite side of the conveyor system 21 and a pair of beams extending transversely of the conveyor system and connecting the upper ends of each of the pairs of columns 27 and 28 to form a rigid box-like structure. The construction of the framework 26, the lower press member 24 and the upper press member 25 is explained in more detail in the previously identified U.S. Pat. No. 4,305,746.

The conveyor system 21 is driven by a suitable source of power such as an electric motor 30 mounted on an upper surface of the horizontal beam 29. The electric motor 30 drives a sprocket 31 which is connected to a second sprocket 32 by a roller link chain 33. The sprocket 32 is attached to an input shaft of a right angle gear box 34 which is mounted on a bracket 35 attached to an outwardly facing side surface of the horizontal beam 29. The gear box 34 has an output shaft 36 which is coupled to an upper end of a telescoping drive shaft 37 by a universal joint 38. The drive shaft 37 includes a smaller diameter shaft portion 39 having an upper end attached to the universal joint 38 and a lower end telescoping inside a larger diameter hollow shaft portion 40. A lower end of the shaft portion 40 is attached to a universal joint 41 which in turn is attached to an input shaft 42 of a right angle gear box 43. The telescoping drive shaft 37 accommodates movement of the conveyor system 21 in a vertical direction as represented by an arrow 44 as will be discussed below.

A bracket 45 is mounted on a vertically extending surface of the column 27 in facing relationship to a similar bracket mounted on the column 28. Each of the brackets 45 supports a linear actuator 46 which drives an extendable and retractable arm 47. The end of each actuator arm 47 is pivotally attached to a bracket 48 which is mounted for slidable movement in the vertical direction along the columns 27 and 28.

Figure 3:
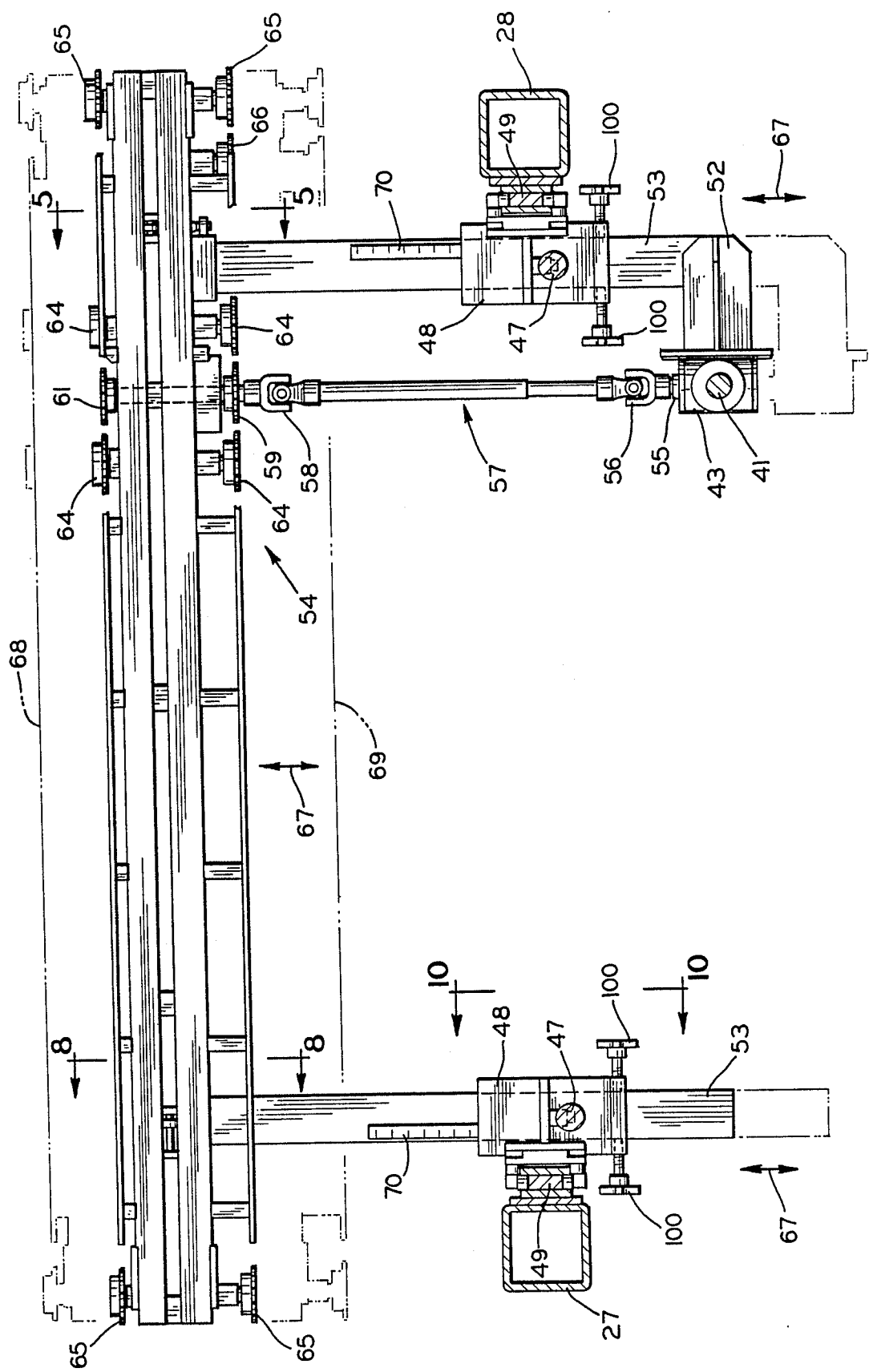
FIG. 3 is an horizontal, enlarged sectional view taken along the line 3—3 in FIG. 1.

As shown in FIGS. 1 and 3, a vertically extending roller track 49 is mounted on each of the columns 27 and 28 below the brackets 45. The brackets 48 slidably engage the corresponding roller track 49 for vertical movement in the direction of the arrow 44. Each of the brackets 48 is provided with a pointer 50 which aligned with a vertically extending rule 51 which is attached to a side of the track 9. A zero point on each of the rules 51 is typically aligned with the glass line defining the path of travel of the glass sheets through the bending apparatus 22. Of course, the elements 45 through 51 are duplicated on the opposite side of the conveyor system 21.

Figure 2:
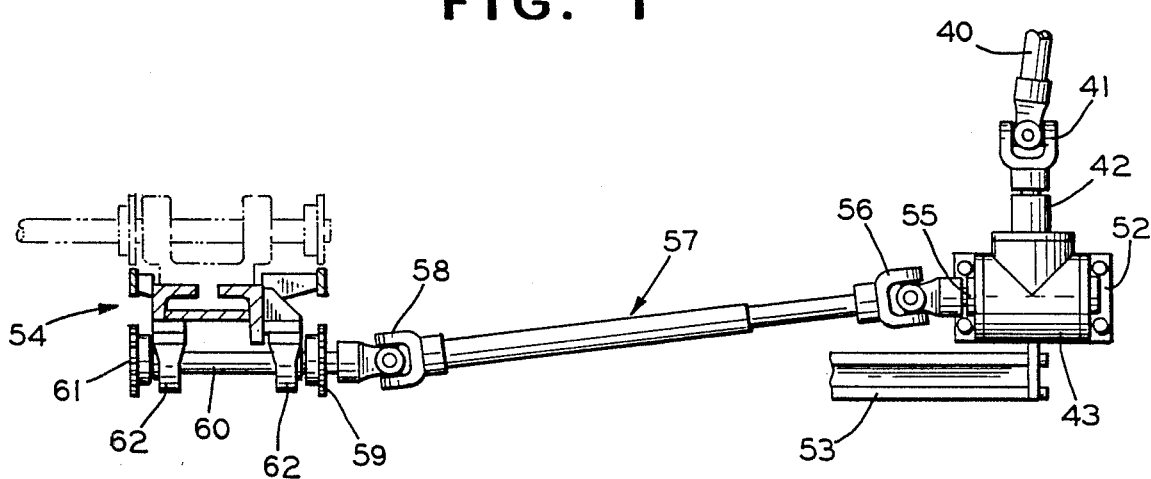
FIG. 2 is a vertical, enlarged sectional view taken along the line 2—2 in FIG. 1.

As shown in FIGS. 1 through 3, the gear box 43 is mounted on a bracket 52 which is attached to an end of a roller track 53. The opposite end of the roller track 53 is attached to a bearing rail assembly 54 as will be described below. The gear box 43 has an output shaft 55 which is attached to a universal joint 56 which in turn is attached to one end of a telescoping drive shaft 57. The opposite end of the drive shaft 57 is coupled to a universal joint 58 which in turn is coupled to a drive sprocket 59. The drive sprocket 59 is mounted on one end of a drive shaft 60 which has a second drive sprocket 61 mounted on its opposite end on the other side of the assembly 54. The drive shaft 60 is rotatably mounted in a pair of pillow blocks 62 attached to a lower surface of the bearing rail assembly 54.

The drive sprocket 59 engages and drives a roller chain 63 (shown in dashed line in FIG. 1). A pair of idler sprockets 64 are mounted on either side of the drive sprocket 59 to engage and tension the roller chain 63. A pair of sprockets 65 are mounted at either end of the bearing rail assembly 54 to engage and reverse the direction of travel of the roller chain 63. Similarly to the drive sprocket 59, the idler sprocket 64 and the reversing sprockets 65 are each mounted on one end of a drive shaft which is rotatably mounted on the bearing rail assembly 54 and has a corresponding sprocket mounted on its other end. A single idler sprocket 66 is rotatably mounted on the bearing rail assembly 54 between the roller track 53 and the sprocket 65 at the end of the bearing rail assembly 54 adjacent the column 28.

Figure 4:
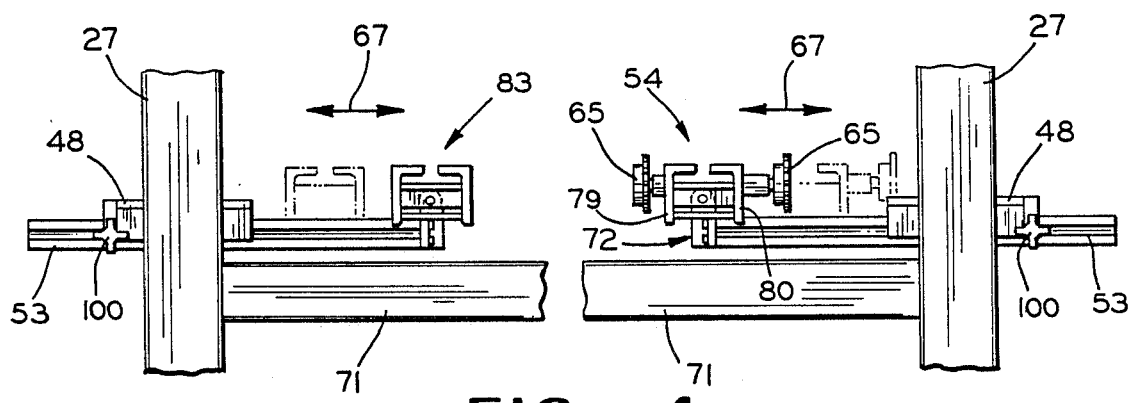
FIG. 4 is an enlarged, front elevational view taken along the line 4—4 in FIG. 1.

As shown in FIGS. 3 and 4, each of the brackets 48 engages an associated one of the roller tracks 53 whereby the roller tracks 53 are free to move in a horizontal direction as shown by arrows 67. Thus, the bearing rail assembly 54 can move in the direction of the arrow 67 with respect to the beams 27 and 28 and such movement will be accommodated by the telescoping drive shaft 57. The possible range of positions of the bearing rail assembly 54 is shown in phantom at 68 and 69 in FIG. 3. Each of the roller tracks 53 is provided with a scale 70 which permits precise location of the opposite ends of the bearing rail assembly 54 with respect to the adjacent edges of the brackets 48. As shown in FIG. 4, the columns 27 are maintained in a precise spaced apart relationship by a horizontally extending beam 71 attached thereto below the tracks 53. Although not shown, a similar beam extends between the columns 28 at the opposite end of the framework 26.

Figure 5:
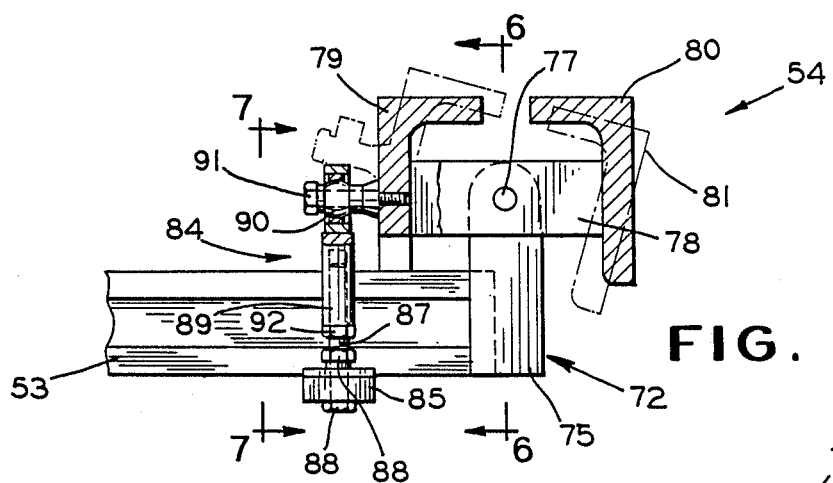
FIG. 5 is an enlarged, vertical sectional view taken along the line 5—5 in FIG. 3.
Figure 6:
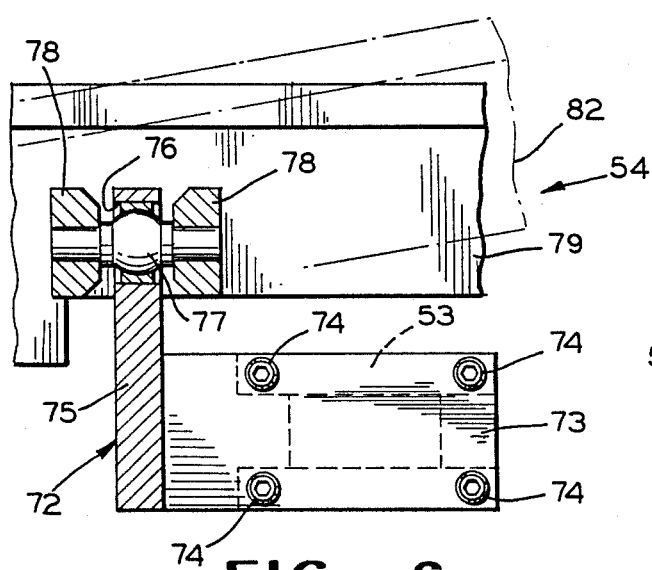
FIG. 6 is an enlarged, vertical sectional view taken along the line 6—6 in FIG. 5.

As shown in FIGS. 5 and 6, a supporting bracket 72 connects the bearing rail assembly 54 to an inwardly facing end of the roller track 53. The bracket 72 has a generally horizontally extending leg 73 attached to the roller track 53 by any suitable fastener means such as cap screw 74. Attached to the horizontal leg 73 is a vertically extending leg 75 having a rounded upper end with an aperture 76 formed therein for retaining a spherical bearing 77. The bearing 77 is attached to a pair of generally horizontally extending spaced apart spacer bars 78. Opposite ends of the spacer bars 78 are attached to a pair of inverted L-shaped rails 79 and 80. In the position shown in FIG. 5, the bottom edge of the vertically extending leg of the rail 79 engages an upwardly facing surface of the roller track 53 to define a generally horizontal orientation for the upwardly facing surfaces of the rails 79 and 80. The spherical bearing 77 permits rotation about an axis extending parallel to the direction of the glass travel through the conveyor system 21 to a position shown in phantom line 81.

As shown in FIG. 6, the spherical bearing 77 also permits rotation about an axis generally parallel to the longitudinal axis of the roller track 53 from the generally horizontal position shown in solid line to a tilted position shown in phantom line 82. Thus, the spherical bearing 77 permits relative rotation about a longitudinal axis of the bearing rail assembly 54 and also permits relative vertical movement of one end of the bearing rail assembly 54 with respect to the other end. The bearing rail assembly 54 is mounted on the roller tracks 53 associated with both the column 27 and the column 28 in the manner shown in FIGS. 5 and 6. A similar bearing rail assembly 83, shown in FIG. 4, is mounted in a similar manner on the roller tracks 53 associated with the columns 27 and 28 on the other side of the conveyor system 21. However, the bearing rail assembly 83 does not include the drive sprockets 59 and 61, the idler sprockets 64 and 66, and the reversing sprockets 65 which are mounted on the bearing rail assembly 54.

Figure 7:
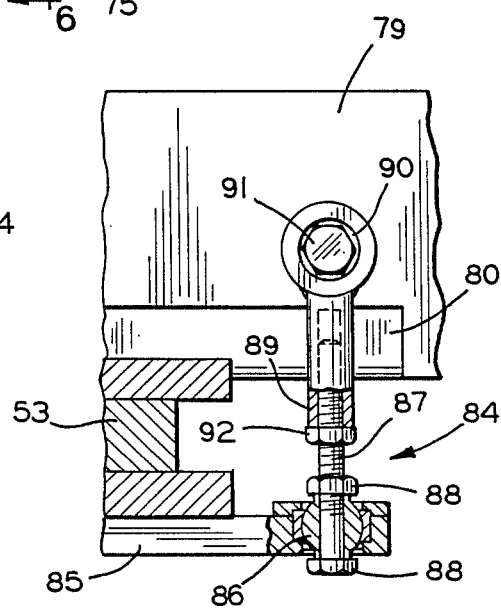
FIG. 7 is an enlarged, vertical sectional view taken along the line 7—7 in FIG. 5.
Figure 8:
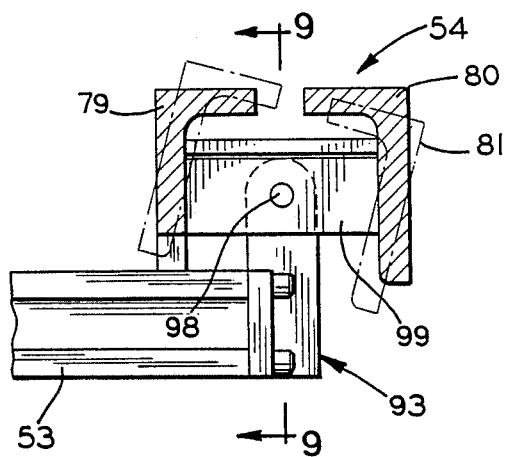
FIG. 8 is an enlarged, vertical sectional view taken along the line 8—8 in FIG. 3.
Figure 9:
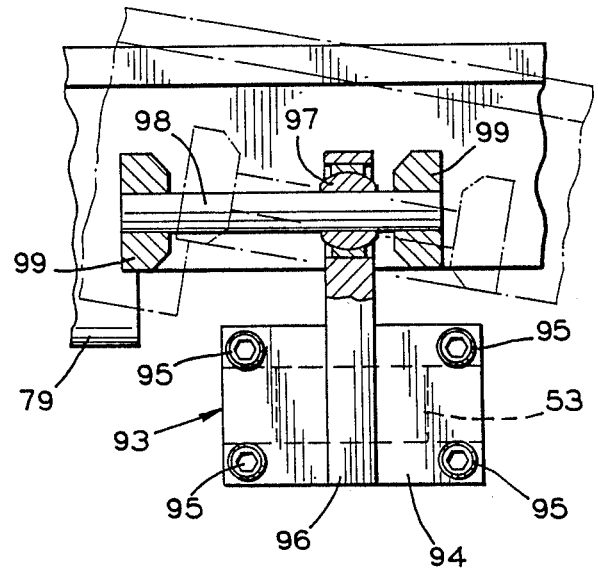
FIG. 9 is an enlarged, vertical sectional view taken along the line 9—9 in FIG. 8.

The difference between the position shown in solid line in FIG. 5 and the position shown in phantom line is approximately twenty degrees. As shown in FIGS. 5 and 7, an adjustment mechanism 84 is utilized to permit movement and lock into position the bearing rail assembly 54 at a desired cant in the twenty degree range. The canting adjustment mechanism 84 includes a generally horizontally extending bracket 85 attached to a lower surface of the roller track 53. A first spherical bearing 86 is mounted on an end of the bracket 85 and accepts one end of a threaded shaft 87. A pair of lock nuts 88 are threadably engaged by the shaft 87 on either side of the spherical bearing 86 to fix the one end of the shaft 87 with respect to the roller track 53. The opposite end of the threaded shaft 87 extends into one end of a hollow tube 89. The opposite end of the hollow tube 89 retains a spherical bearing 90. A threaded fastener 91 extends through the center of the spherical bearing 90 and threadably engages the vertically extending leg of the rail 79. A stop nut 92 is threadably engaged by the shaft 87 and is positioned above the upper one of the lock nuts 88. The stop nut 92 engages the lower end of the hollow tube 89 to determine the degree of cant of the bearing rail assembly There is shown in FIGS. 8 and 9, the mounting of the end of the bearing rail assembly 54 adjacent the column 27. A supporting bracket 93 has a horizontally extending leg 94 attached to an end of the roller track 53 by any suitable fastener such as cap screws 95. Attached to a central portion of the horizontal leg 94 is a generally vertically extending leg 96 which retains a spherical bearing 97 at its upper end. Extending through the center of the spherical bearing 97 is an elongated shaft 98 having opposite ends attached to a pair of spacer bars 99 extending between the rails 79 and 80. As the opposite ends of the bearing rail assembly 54 are moved in a vertical direction with respect to one another, the distance between the roller tracks 53 will vary. Thus, the elongated shaft 98 accommodates this change in dimension.

Figure 10:
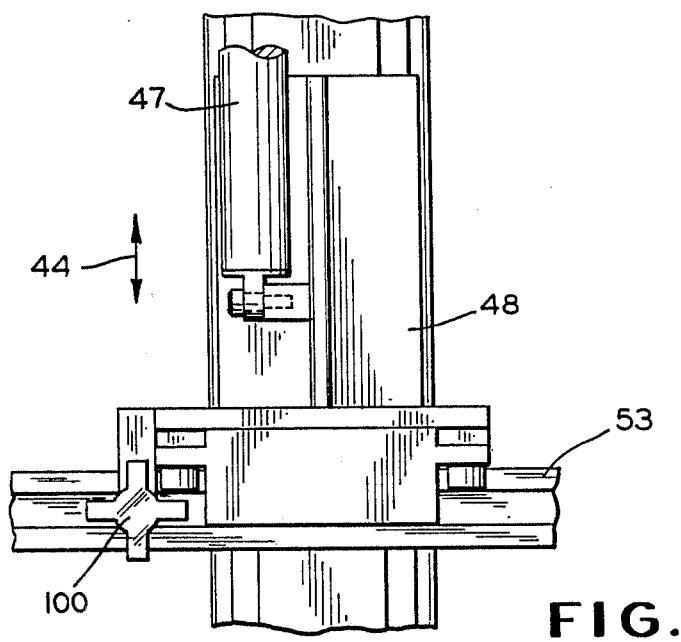
FIG. 10 is an enlarged, vertical sectional view taken along the line 10—10 in FIG. 3.

As seen in FIGS. 3 and 10, the bracket 48 which engages the roller track 53 includes a pair of knob shoe assemblies 100 which are threadably retained in the bracket 48 and extend into frictional engagement with the roller track 53. Thus, when it is desired to move the bearing rail assembly 54 in the direction of the arrow 67, each of the assemblies 100 is loosened to disengage from the respective roller track 53 thereby allowing the roller track 53 to be manually moved with respect to the corresponding one of the brackets 48. When the desired position has been attained as shown by the scale 70, the assemblies 100 are once again tightened to prevent further movement. In order to cant the bearing rail assembly 54, the stop nut 92 is moved along the threaded shaft 87 to the desired position within the range of rotation about the spherical bearings. In order to raise or lower one or both ends of the bearing rail assembly 54, the appropriate linear actuator 46 is enabled until the associated pointer 50 is adjacent the desired marking on the associated rule 51. In one type of windshield, beneficial results have been achieved by ramping the conveyor system 21 upwardly toward the entrance to the tempering station 23 thereby producing high quality windshields.

Figure 11:
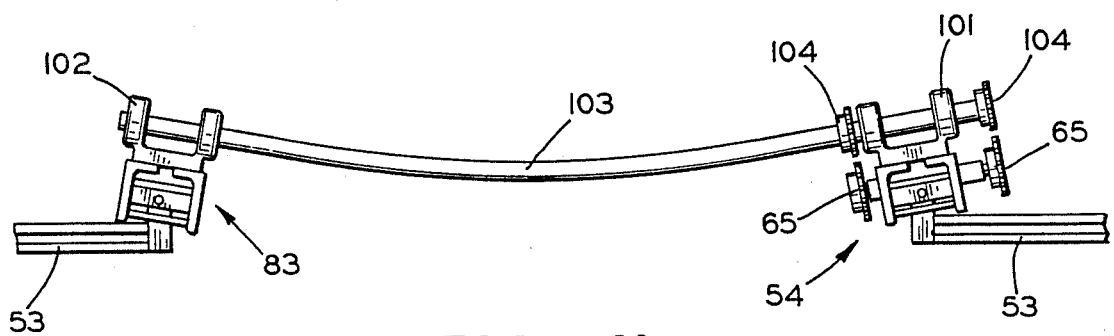
FIG. 11 is a front elevational view of a conveyor roll and bearing rails in accordance with the present invention.

As shown in FIG. 11, the bearing rail assemblies 54 and 83 each retain a bearing assembly 101 and 102 respectively which are representative of pairs of such bearing assemblies spaced along the bearing rail assemblies. The bearing assemblies 101 and 102 retain opposite ends of a conveyor roll 103 which is curved to support the glass sheets passing through the bending station. Sprockets 104 are coupled to the roll 103 for driving the roll in rotation in a known manner.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for supporting a plurality of conveyor rolls for conveying glass sheets through a bending station comprising:
    a spaced pair of bearing rails adapted to support opposite ends of each of a plurality of glass sheet conveyor rolls:
    a ground engaging framework;
    a bracket attached to said framework for each and of each said bearing rail; and
    means coupled to said bracket for independently adjusting a position of each end of each said bearing rail with respect to said framework.

2. The apparatus according to claim 1 wherein said means for adjusting includes a linear actuator attached to said bracket and having an actuator arm with an end pivotally attached to said bearing rail.

3. The apparatus according to claim 1 wherein said means for adjusting moves an end of said bearing rail in a generally vertical direction.

4. The apparatus according to claim 1 including means for indicating said position of said bearing rail.

5. The apparatus according to claim 4 wherein said means for indicating includes a rule mounted on said framework and a cooperating pointer mounted on said means for adjusting.

6. The apparatus according to claim 1 wherein said means for adjusting includes a roller track slidably engaging said bracket and coupled to said bearing rail, said roller track extending in a generally horizontal direction for moving said bearing rail in said horizontal direction with respect to said framework.

7. The apparatus according to claim 1 wherein said means for adjusting includes a first spherical bearing mounted on said bracket and a second spherical bearing mounted on said bearing rail, said first and second spherical bearings being connected by an adjustable link for permitting rotational movement of said bearing rail about a longitudinal axis thereof.

8. The apparatus according to claim 7 wherein said adjustable link includes a threaded shaft attached to said first spherical bearing, a hollow tube attached to said second spherical bearing, and a stop nut threadably retained on said threaded shaft and engaging an open end of said hollow tube into which said threaded shaft is inserted.

9. The apparatus according to claim 1 wherein said means for adjusting includes a spherical bearing coupled between said bracket and said bearing rail for permitting rotational movement of said bearing rail about a longitudinal axis thereof.

10. The apparatus according to claim 9 wherein said bearing rail is mounted on an elongated shaft extending through said spherical bearing for movement parallel to said longitudinal axis.

11. An apparatus for supporting a plurality of conveyor rolls for conveying glass sheets through a bending station having a supporting framework comprising:
    a bearing rail adapted to support an end of each of a plurality of conveyor rolls;
    first means attached to said framework for adjusting a position of said bearing rail in a generally vertical direction; and
    second means attached to said framework for adjusting a position of said bearing rail in a generally horizontal direction.

12. The apparatus according to claim 11 wherein said first means includes a pair of spaced apart linear actuators each adapted to be attached to the framework and having an actuator arm pivotally coupled to opposite ends of said bearing rail.

13. The apparatus according to claim 11 wherein said second means includes a pair of roller tracks each adapted to be slidably attached to the framework for movement in a generally horizontal direction and having one end coupled to said bearing rail.

14. The apparatus according to claim 13 wherein said second means includes a supporting bracket attached to said one end of each of said roller tracks and a spherical bearing coupling said supporting bracket to said bearing rail to permit rotational movement of said bearing rail about a longitudinal axis thereof.

15. The apparatus according to claim 14 wherein at least one of said spherical bearings slidably retains an elongated shaft, opposite ends of said shaft being attached to said bearing rail to permit movement of said bearing rail relative to said spherical bearing along said longitudinal axis.

16. The apparatus according to claim 15 including rotation limitation means having first and second spherical bearings, said first spherical bearing being retained by said roller track and said second spherical bearing being retained by said bearing rail, a threaded shaft being retained by said first spherical bearing, a hollow tube being attached to said second spherical bearing and retaining an end of said threaded shaft, and a stop nut threadably retained by said threaded shaft and abutting said hollow tube for limiting said rotational movement of said bearing rail.

17. The apparatus according to claim 11 including another bearing rail adapted to support an opposite end of each of said conveyor rolls; third means attached to said framework for adjusting a position of said another bearing rail in a generally vertical direction; and fourth means attached to said framework for adjusting a position of said another bearing rail in a generally horizontal direction.

18. An apparatus for supporting a plurality of conveyor rolls for conveying glass sheets through a bending station having a supporting framework comprising:
a pair of spaced apart generally parallel bearing rails adapted to support opposite ends of a plurality of conveyor rolls;
four linear actuators adapted to be attached to a framework and each having an actuator arm pivotally coupled to an end of an associated one of said bearing rails for positioning said bearing rails in a vertical direction;
four roller tracks each adapted to be slidably coupled to the framework and extend in a generally horizontal direction perpendicular to a longitudinal axis of an associated one of said bearing rails, an end of each of said roller tracks being coupled to an associated end of one of said bearing rails; and
spherical bearing means for coupling said roller tracks to said bearing rails to permit rotation of said bearing rails about their longitudinal axes.

19. The apparatus according to claim 18 including means for permitting relative movement between each of said bearing rails and an associated one of said spherical bearing means.

20. The apparatus according to claim 18 including means for limiting said rotation of said bearing rails.

* * * * *

UNITED STATES PATENT AND TRADEMARK OFFICE
CERTIFICATE OF CORRECTION

PATENT NO. : 4,799,948

DATED : January 24, 1989

INVENTOR(S) : Allan T. Enk et al

It is certified that error appears in the above-identified patent and that said Letters Patent is hereby corrected as shown below:

Column 3, line 30, "9" should read --49--.

Column 6, claim 1, line 8 "and" should read --end--.

Column 6, claim 2, line 15, after "to" insert --each--.

Signed and Sealed this

Fifth Day of December, 1989

*Attest:*

JEFFREY M. SAMUELS

*Attesting Officer*     *Acting Commissioner of Patents and Trademarks*